3,365,491
OXIDATION OF CYCLOHEXANE
Cyril Gardner and John Fraser Prescott, Manchester, England, assignors to Imperial Chemical Industries Limited, London, England, a corporation of Great Britain
No Drawing. Filed May 15, 1964, Ser. No. 367,862
Claims priority, application Great Britain, May 27, 1963, 21,084
8 Claims. (Cl. 260—533)

ABSTRACT OF THE DISCLOSURE

Oxidation of liquid cyclohexane by passage of gaseous oxygen/nitrogen mixtures in which the proportion of oxygen is increased as the oxidation proceeds.

---

This invention relates to the oxidation of cyclohexane with oxygen containing gases.

It has already been proposed to oxidise cyclohexane in the liquid phase with oxygen or oxygen containing gases to give cyclohexanone, cyclohexanol and various other oxidation products including adipic acid. Such processes are further described in U.S. Patents Nos. 2,439,513 and 2,557,282.

We have now found that a remarkable improvement in the quality of the product obtained by such processes is achieved by using a mixture of oxygen with a diluent gas such as nitrogen as the oxidising agent and changing the proportions of the gases in the mixture during the course of the oxidation preferably so that the proportion of oxygen is increased. The oxidation product initially obtained by the oxidation of cyclohexane with oxygen containing gases (usually mixtures of oxygen and nitrogen) contains a proportion of unchanged cyclohexane. After the unchanged cyclohexane has been removed the residue containing a mixture of oxidation products usually known as crude KA is useful for the manufacture of adipic acid by nitric acid oxidation. It is found that crude KA obtained according to the process of the present invention gives an unusually high yield of adipic acid when subjected to nitric acid oxidation.

Thus according to the present invention we provide a process for the oxidation of cyclohexane in the liquid phase with mixtures of oxygen with other gases wherein the proportion of oxygen in the gaseous mixtures is varied during the course of the oxidation, preferably being increased as the oxidation proceeds.

It is found convenient to conduct the oxidation within the temperature range from 125° to 160° C. in the presence of an oxidation catalyst such as cobalt naphthenate or alternatively in the absence of catalyst in the temperature range 160°–190° C. using a mixture of oxygen with nitrogen the mixture initially containing for example from 1 to 5% by volume of oxygen, the proportion of oxygen in the mixture being increased for example during the oxidation to from 5 to 21% by volume.

The invention is illustrated but not limited by the following Example in which parts and percentages are by weight unless otherwise stated.

Example 778 parts of cyclohexane containing 50 p.p.m. cobalt (as cobalt naphthenate) were charged to a stainless steel reactor 5 feet long by 2 inches internal diameter of capacity 2000 mls. The reactor was pressurised to 120 p.s.i.g. with nitrogen and heated to 155° C. for 55 minutes. A mixture of nitrogen and oxygen was passed at the rate of 250 litres per hour. During the oxidation the concentration of oxygen by volume in the feed gas was varied as follows: 6.8% for the first 10 minutes, 12.3% for the next 20 minutes and 21% for the following 25 minutes. After the completion of the oxidation, the reactor was cooled to 20° C. and the reaction product was removed. 500 parts of water and 500 parts of cyclohexane were then added to the reactor and after heating at 1000° C. for 30 minutes, the water/cyclohexane was collected. The combined hydrocarbon and aqueous products were distilled to separate the unconverted cyclohexane and water. A distillation residue was obtained amounting to 132.2 parts. The percentage conversion of the cyclohexane was 14.4%. On oxidation with nitric acid, one part of the distillation residue yielded 1.120 parts of adipic acid. Calculated on the cyclohexane consumed, the yield of adipic acid was 76%.

What we claim is:

1. Process for the oxidation of cyclohexane in the liquid phase with mixtures of oxygen with nitrogen wherein the proportion of oxygen in the gaseous mixtures is varied increasingly during the course of the oxidation.

2. Process according to claim 1 wherein the oxidation is conducted within the temperature range from 125° C. to 160° C. in the presence of an oxidation catalyst.

3. Process according to claim 1 wherein a mixture of oxygen with nitrogen is employed, the proportion of oxygen in the mixture being increased during the oxidation up to 21% by volume.

4. Process for the manufacture of adipic acid wherein the mixture of oxidation products obtained according to claim 1 is further oxidised with nitric acid.

5. Process according to claim 2 wherein the oxidation catalyst is cobalt naphthenate.

6. Process according to claim 1 wherein the oxidation is conducted within the temperature range of 160–190° C. in the absence of a catalyst.

7. A process for the oxidation of cyclohexane in the liquid phase with mixtures of oxygen with nitrogen wherein the proportion of oxygen in the gaseous mixtures is increased from its initial value up to 21% by volume during oxidation, said oxidation being conducted within the temperature range of 125° C. to 160° C. in the presence of an oxidation cataylst.

8. A process for the oxidation of cyclohexane in the liquid phase with mixtures of oxygen with nitrogen wherein the proportion of oxygen in the gaseous mixtures is increased from its initial value up to 21% by volume during oxidation, said oxidation being conducted within the temperature range of 160° C. to 190° C. in the absence of a catalyst.

References Cited

UNITED STATES PATENTS 2,439,513    4/1948    Hamblet et al. _____ 260—533

HENRY JILES, *Primary Examiner.*

LORRAINE A. WEINBERGER, *Examiner.*

S. WILLIAMS, *Assistant Examiner.*